April 1, 1969 E. F. BAKKER 3,436,750
WRITE AND READ CIRCUIT ARRANGEMENT FOR A MAGNETIC STORAGE WITH MAGNETIZABLE CORES
Filed April 1, 1966
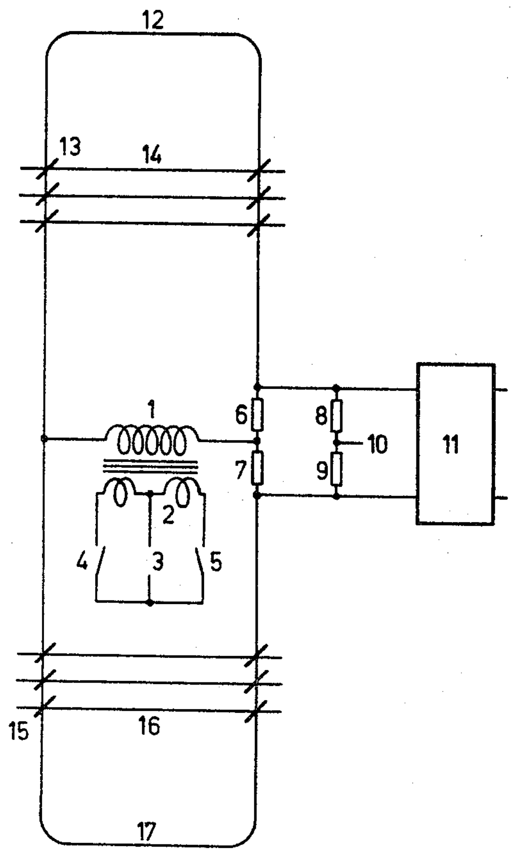
INVENTOR
EELKE F. BAKKER
BY
Frank R. [signature]
AGENT United States Patent Office 3,436,750

Patented Apr. 1, 1969

3,436,750

WRITE AND READ CIRCUIT ARRANGEMENT FOR A MAGNETIC STORAGE WITH MAGNETIZABLE CORES

Eelke Folkert Bakker, Hengelo, Overijsel, Netherlands, assignor to N.V. Hollandse Signaalapparaten, Hengelo, Overijsel, Netherlands, a firm of the Netherlands Filed Apr. 1, 1966, Ser. No. 539,464
Claims priority, application Netherlands, Apr. 1, 1965, 6504349
Int. Cl. G11b 5/00
U.S. Cl. 340—174 3 Claims This invention relates to a write and read circuit arrangement for a magnetic storage with magnetizable cores, in which each write and read winding is divided into two parts that are fed in parallel during the writing operation, and each of which is connected by way of a resistance to one of the terminals of the supply source, the end away from said source of each of these resistances being connected to a separate input terminal of the reading amplifier.

In most circuit arrangements of the type described above the two parts of a read and write winding are symmetrical, or at any rate approximately symmetrical, so that they have impedances that are at least nearly equal. If in such an arrangement the two resistances are equal, then the difference between the potentials applied to the input terminals, that is zero in the quiescent condition of the arrangement, will not reach the high value that would have resulted from a reading pulse of the same amplitude as the writing pulse. Although, because of unavoidable unsymmetries of the two parts of the reading and writing circuit, during the writing operation a voltage across the input terminals of the amplifier may be expected that is substantially higher than the corresponding voltage caused by a reading pulse, the former voltage is nevertheless not so high that, during a time interval of unacceptable duration, it can impair the availability of the amplifier as means for amplifying reading pulses. In an arrangement of the known type, however, although the difference between the potentials of the input terminals of the amplifier remains low, the change in each of these potentials is considerable. The actual amplitude of each potential change depends on the point in the reading and writing circuit which has a constant potential. In various known embodiments of arrangements of the type mentioned above one of the terminals of the supply source is grounded or has a constant potential. In any case, the change in the potential of at least one of the input terminals of the reading amplifier has a considerable amplitude. These changes lead to changes of such amplitude in the potentials of various parts of the amplifier circuitry that the amplifier is no longer able to amplify the weak reading pulses. In so far as these potential changes occur in parts of the amplifier circuitry the time constants of which are not neglectable, for instance because these parts contain capacities and resistances, the inability of the amplifier to amplify reading pulses may be maintained during intervals the length of which is unacceptable in connection with the reduction in operation speed of the storage resulting therefrom.

It is an object of the present invention to reduce the length of the intervals mentioned above during which the reading amplifier is made incapable of amplifying reading pulses by corresponding changes in the potentials of both amplifier-input-terminals resulting from writing operations. For this purpose the arrangement is built in such a way that the input terminals of the reading amplifier are bridged by a voltage divider, connected in parallel to the circuit comprising the two resistances in series and the tapping point of which is connected to a point having a constant potential, whilst the supply source consists of a secondary winding of a pulse transformer.

Preferably the tapping point is situated in the middle of the voltage divider; moreover, it is preferably directly connected to a point with a constant potential. Because of the fact that the supply source is a transformer, apart from its connection to the voltage divider and the amplifier, the reading and writing circuit can be isolated from the remaining part of the circuitry of the arrangement. Owing to this isolation and to the fact that the two parts of the reading and writing circuit are balanced, no current, or practically no current, in the voltage divider will result from the writing operation, so that, during the writing operations, the potentials of the input terminals of the amplifier will not, or at any rate no more than slightly, differ from their quiescent values. These quiescent values of the potentials need not be equal to the potential of the tapping point of the voltage divider, for in many amplifiers the two branches carry the base currents of the first amplifier transistors. However, the blocking of the amplifier is caused by changes in the input potentials and these changes remain slight, as has been elucidated, so that the amplifier will be available for amplifying reading pulses immediately or practically immediately after a writing operation has been effected.

The invention will now be elucidated by describing one of its embodiments with reference to the annexed drawing.

The figure shows one reading- and writing circuit for a magntic matrix storage with two ring shaped cores per bit. The reading- and writing wire of this circuit is divided into two parts, the part 12 and the part 17. The part 12 of this wire first passes through all the cores in the upper part of the storage that are situated in one of the two columns allotted to the bit for which the wire is used, and then back through the cores in said upper part that are situated in the other column allotted to said bit. The part 17 of the reading- and writing wire passes in the same way through the cores that are allotted to the same bit in the lower part of the storage. Be it assumed that the two parts of the reading- and writing wire are arranged so as to approximate complete symmetry as far as possible, for which purpose the number of lines in the upper part must be equal or nearly equal to the number of lines in the lower part. One end of both parts of the reading- and writing wire is directly connected to one terminal of the source of writing current (1), whilst the remaining end of each part of this wire is connected to the other terminal of this source, by way of a separate resistance. In the embodiment now described, in which the two parts of this wire are symmetrical, or nearly symmetrical, these two resistances are equal, or nearly equal. The current source that supplies the writing currents, consist of the secondary winding 1 of a pulse transformer. Its primary winding 2 is divided into two equal parts by means of a central tapping point that is connected to one terminal of a direct voltage source 3. Each of the free ends of this primary winding can be connected, by way of an electronic switch 4, 5, to the other terminal of the voltage source 3. Depending on the electronic switch that is closed, either the one or the other part of the primary winding temporarily carries current, and the field in the transformer core has either the one or the other direction, causing a pulse in either the one or the other direction to be induced in the secondary winding 3. In this way writing pulses in either direction, but with the same strength, can be supplied to the reading and writing wire. Owing to the fact that the two parts of the reading- and writing wire are at least nearly symmetrical, the currents passing through the two resistances 6 and 7 during the writing operation are at least nearly equal in strength, but they will have opposite directions. Consequently, the voltages across these resistances caused by said currents will also be at least nearly equal, and have opposite directions. The voltage supplied to the input terminals of the reading amplifier is equal to the sum of these voltages with opposite sign across the resistances 6 and 7, and will, therefore, be much lower than the voltages that would have resulted from a reading current having the same strength as the writing current.

In order to write a bit of a certain value in a predetermined column on a certain line of the storage, a current or pulse with a predetermined direction is caused to flow in the word-conductor 14 allotted to said line. Simultaneously a writing pulse, the direction of which is determined by the value of the bit to be written, is caused to flow through the writing- and reading wire allotted to the column in which the bit is to be written. This pulse strengthens the field caused by the current in the word conductor 14 in one of the two cores allotted to said bit in said line, but weakens the magnetic field in the other one of these cores. Consequently, as a result of the writing operation, one of the cores will be more strongly magnetised than the other. In which of the cores the magnetisation is strongest depends on the direction of the writing pulse. In order to read the information present in a line of the storage, a current or pulse of opposite direction is caused to flow through the word conductor 14 allotted to said line, with the result that the magnetization of all the cores of said line returns to the quiescent value. When this happens two cores situated on said line and allotted to the same bit induce voltages with different amplitude and opposite direction in the reading- and writing wire for said bit. Because the circuits through both primary windings of the pulse transformer are interrupted at this moment, its secondary winding will have a high impedance, so that practically no current will pass through it as a result of the reading voltages. Practically all current caused by the difference between the voltages induced by the two cores coupled to the writing- and reading wire will pass through the two parts of this wire and through the two resistances 6 and 7 in series, and this current generates a voltage with an amplitude and direction corresponding to amplitude and direction of the current in the reading and writing wire across these resistances and the input terminals of the reading amplifier.

It is to be noted that a voltage supplied by the pulse transformer with such a direction that it causes a current to flow through the upper part 12 of the reading- and writing wire that weakens the magnetisation of the core in the selected line and, for instance, the left one of the pair of columns allotted to the bit in question, will cause a current to flow through the lower part 17 of the wire that strengthens the field in a core in the same left column. Registrations in the lower and upper half of the storage caused by writing voltages with the same direction will, therefore, result in reading voltages of opposite direction. For this reason the direction of the pulses supplied for the purpose of writing a bit of a certain value in the upper part of the storage is opposite to that of the pulses supplied for writing a bit of the same value in the lower part of the storage. It is also possible to use currents of opposite direction in the word conductors of the two parts of the storage.

The difference between the potentials applied to the input terminals of the amplifier is considerably lower than might be expected in connection with the strength of the writing current but this does not necessarily means that the variation in the potential of each of these terminals remains low. The amplitude of this variation depends on the point of the writing- and reading circuit that is connected to a point of constant potential. In the known circuits, usually one of the terminals of the secondary winding of the pulse transformer obtains a constant potential. Whichever point of the circuit has a constant potential, there will in any case be a moment during the writing cycle at which one or both input terminals of the amplifier temporarily obtain a potential that substantially differs from the quiescent potential. Such a substantial potential variation causes considerable changes in the electric state of various parts of the amplifier circuitry, and some of these changes prevent the amplifier from amplifying weak voltages, such as the reading pulse voltages. In so far as these changes occur in circuits with time constants that are not neglectable, for instance because these circuits, apart from resistances, also comprise condensers the charge of which is influenced by the potential variations, these changes and the inability to operate as an amplifier for reading pulse will be maintained for a certain interval after the variation in the potential of the input terminals has disappeared. The delays in the operation of the storage caused thereby are unacceptable in present data handling systems. It is impossible for the amplifier to be disconnected from the writing- and reading wire during the writing operation because the electronic switches required for this purpose would influence the weak reading pulse voltages too strongly. The amplifier must, therefore, remain connected to the reading- and writing wire but it should nevertheless be able to amplify reading pulses practically immediately after a writing operation has taken place. In an arrangement according to the invention both the amplifier terminals and the series connection of the resistances 6 and 7 in the reading- and writing circuit are bridged by a potential divider 8, 9, the tapping point 10 of which is connected to a point of constant potential, whilst the writing pulse source consists of a pulse transformer. Furthermore this source as well as both parts of the reading- and writing wire, are completely isolated from the other parts of the circuitry, which is made possible by the use of a transformer as pulse source. The reading- and writing wires now being completely isolated, apart from their connection to the amplifier and the voltage divider, no current can flow from these wires to the tapping point of the voltage divider, and thus change the potentials of the input terminals of the amplifier, during the writing operation. Moreover, as has been shown above, the voltage across the amplifier input terminals and the voltage divider is not high, so that the currents arising in the voltage divider as a result of the writing operation will be at most small currents and they can only cause slight changes in the potentials of the amplifier input terminals.

Consequently no substantial changes in the electric states of the various parts of the amplifier circuitry will result from the writing operation, and practically directly after a writing operation has been performed the amplifier will be able to amplify the small reading pulse voltages. The only delay that must be taken into account results from transients in the reading- and writing wire circuit, but these require considerably less time than the transients occurring in the amplifier.

It will be obvious that the application of the invention is not restricted to matrix storages with two cores per bit. It can also be applied in matrix storages with one core per bit, in which each reading- and writing wire is only coupled to the cores of one single column. Moreover, a storage to which the invention is applied need not necessarily be arranged in matrix shape.

Although the balanced arrangement of the reading and writing wires and the resistances 6 and 7 prevents the voltages which occur across the amplifier input terminals during the writing operation from becoming high enough to block the amplifier nevertheless the voltages received during the writing operation are, as a rule, considerably higher than the voltages resulting from the reading operations. The voltages supplied by the output circuit of the amplifier during the writing operation may, therefore, become so high as to lead to undesirable phenomena in the circuit arrangement following on the amplifier. The amplified reading voltages supplied by the output circuit of the amplifier are, however, high enough to permit switching operations by electronic switches to be effected in this circuit. The output circuit of the reading amplifier can therefore be switched off or short circuited during writing operations, a measure, however, that is not related to the invention.

The fixed potential applied to the tapping point 10 of the voltage divider is adapted to the desired level of the amplifier output voltages if no direct current separation by condensers is effected in the amplifier.

It is not necessary for the two parts of a reading- and writing-wire to be completely symmetrical. If the difference is not too great, a correction by adaptation of the ratio of the values of the resistances 6 and 7 would be possible. It is to be noted, however, that the impedance of the reading and writing wire does not consist of a pure resistance, but is inductive so that a complete equilibrium cannot be reached by adaptation of the ratio of the resistances 6 and 7.

What is claimed is:

1. Write and read circuit arrangement for a magnetic storage device with magnetic cores, comprising a read and write winding threading all of said cores, each said write and read winding being divided into two parts, each of said parts being energized in parallel during the writing operation, each of said parts being connected by a resistance to one of the terminals of a supply source, said supply source consisting of the secondary winding of a pulse transformer, a read amplifier having a plurality of input terminals, the end remote from said source of each said resistance being connected to a separate input terminal of said read amplifier, a voltage divider bridging the input terminals of said read amplifier and connected in parallel to the two said resistances a point of constant potential, and means connecting the tapping point of said divider to said point of constant potential.

2. Circuit arrangement according to claim 1, wherein the two parts of the writing- and reading winding are substantially symmetrical, and the two resistances, by way of which the two parts are connected to one terminal of the supply source, are substantially equal.

3. Circuit arrangement according to claim 1, wherein the tapping point of the voltage divider is situated in the electrical middle thereof.

References Cited

UNITED STATES PATENTS 3,319,233 5/1967 Amemiya et al. ______ 340—174

BERNARD KONICK, *Primary Examiner.*

S. P. KOTILOW, *Assistant Examiner.*